United States Patent
Jäckel et al.

[11] Patent Number: 6,056,099
[45] Date of Patent: May 2, 2000

[54] METHOD OF MAKING RECESSES IN METALLIC WORKPIECES FOR USE TORQUE TRANSMITTING APPARATUS

[75] Inventors: Johann Jäckel, Baden-Baden; Heinz Molt, Heiningen, both of Germany

[73] Assignee: LuK Lamellen und Kupplungsbau GmbH, Buhl., Germany

[21] Appl. No.: 08/125,002

[22] Filed: Sep. 21, 1993

[30] Foreign Application Priority Data

Sep. 26, 1992 [DE] Germany ............... 42 32 320

[51] Int. Cl.⁷ ............. B21K 21/00; B21D 53/88; F16D 13/60; B60K 17/02
[52] U.S. Cl. .............. 192/70.17; 192/212; 74/572
[58] Field of Search ............ 192/106.1, 106.2, 192/89.23, 70.17; 74/572

[56] References Cited

U.S. PATENT DOCUMENTS

| | | |
|---|---|---|
| 2,850,131 | 9/1958 | Maurice et al. ............ 192/35 X |
| 4,057,131 | 11/1977 | Flotow . |
| 4,932,921 | 6/1990 | Kobayashi et al. ............ 192/106.2 X |
| 5,054,598 | 10/1991 | Tojima ................ 192/89.23 X |
| 5,146,811 | 9/1992 | Jäckel . |
| 5,156,249 | 10/1992 | Friedman . |
| 5,160,007 | 11/1992 | Reik et al. . |
| 5,161,660 | 11/1992 | Huber . |
| 5,257,715 | 11/1993 | Jäckel . |
| 5,261,516 | 11/1993 | Friedman . |
| 5,279,182 | 1/1994 | Fukushima ................ 74/572 |
| 5,293,977 | 3/1994 | Friedmann ........... 192/106.2 X |
| 5,301,780 | 4/1994 | Jackel .............. 192/106.2 X |

FOREIGN PATENT DOCUMENTS 1179670 1/1970 United Kingdom .

*Primary Examiner*—Charles A Marmor
*Assistant Examiner*—Saúl Rodriguez
*Attorney, Agent, or Firm*—Darby & Darby

[57] ABSTRACT

A selected portion of a surface of a metallic workpiece such as the end surface of a tubular workpiece, is provided with one or more recesses by resorting to a tool having a preferably pointed tip and being driven into the surface to displace the material of the workpiece substantially transversely of the thus obtained recess. The latter can be used to facilitate the establishment of a separable connection between the workpiece and a substantially disc-shaped section of a cover or housing in a friction clutch for use in motor vehicles. The tool can be left in the recess to serve as a locating or centering device for the workpiece.

18 Claims, 2 Drawing Sheets

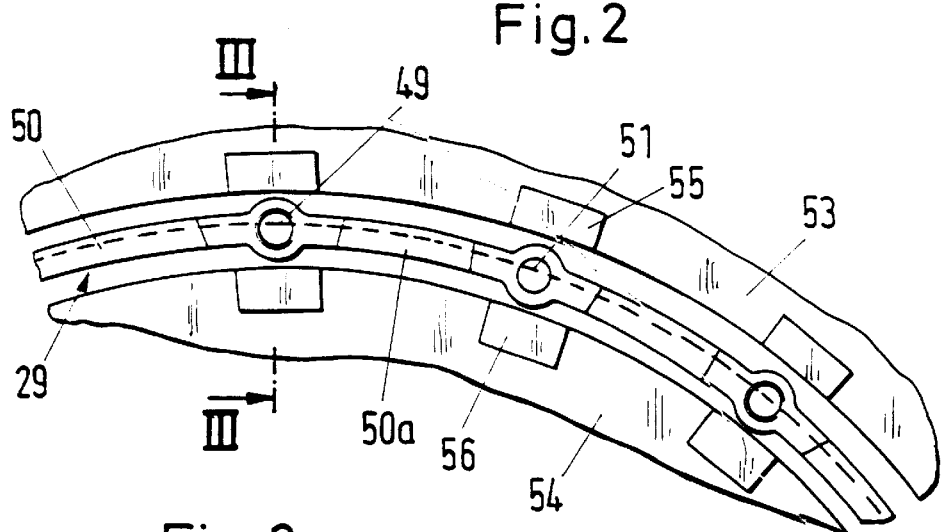
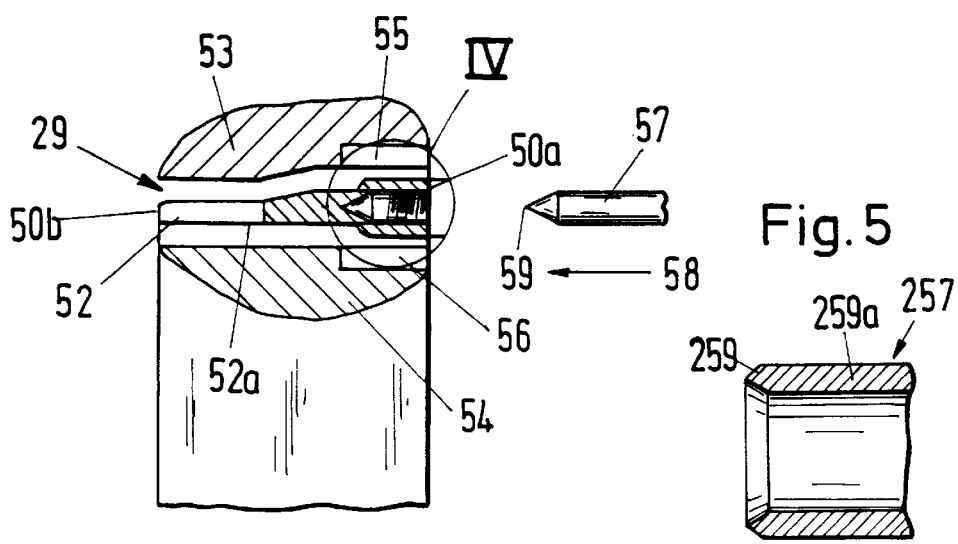
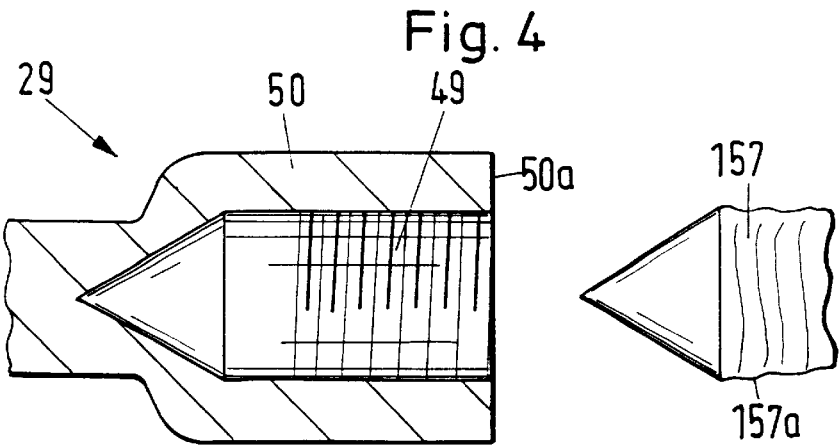

METHOD OF MAKING RECESSES IN METALLIC WORKPIECES FOR USE TORQUE TRANSMITTING APPARATUS

BACKGROUND OF THE INVENTION

The invention relates to improvements in methods of making recesses in at least partially metallic workpieces. More particularly, the invention relates to improvements in methods of making recesses (e.g., in the form of tapped or untapped blind holes or through holes) in workpieces which can be used in torque transmitting apparatus, for example, in the housings or covers of friction clutches for use in motor vehicles.

As a rule, a recess in a metallic workpiece is obtained by removing material from the workpiece, e.g., by resorting to a drill or to another suitable material removing tool. If the workpiece is to be provided with an internal thread, the treatment with a drill or with another material removing tool (which has been used to form a recess) must be followed by a treatment with a second tool which cuts a thread into the surface surrounding the recess. An internal thread is necessary if the recess is to receive a portion of an externally threaded shank forming part of a screw, bolt, spindle, feed screw, pin, post or the like. For example, it is often necessary to accurately center the workpiece relative to another part by resorting to so-called alignment, locating or centering pins (also called fixing or stead pins), dowel pins, drift pins or plugs, set pins or the like. A centering pin must be installed in a recess with a very high degree of accuracy in order to ensure that the thus coupled and centered parts are secured to each other with a minimum of play, i.e., within an acceptable range of tolerances. Such accuracy can be achieved by resorting to material removing and surface smoothing tools in the form of reamers or the like. All this contributes significantly to the cost of the workpieces, of the combinations of such workpieces with one or more additional workpieces as well as of the machines, apparatus or other devices in which the recessed workpieces are put to use. In addition, it is often difficult to dismantle an apparatus, machine or another device which employs one or more workpieces having one or more recesses which are obtained as a result of removal of metallic material from a blank or from a semifinished component of a friction clutch or the like.

OBJECTS OF THE INVENTION

An object of the invention is to provide a method of making recesses (such as tapped or untapped blind holes or through holes) in metallic workpieces in a simple and inexpensive manner.

Another object of the invention is to provide a method which renders it possible to avoid removal of material from a workpiece in the course of a recess forming or making operation.

A further object of the invention is to provide a method which can be utilized for the making of recesses in workpieces including or constituting blanks or preforms of sheet metal.

An additional object of the invention is to provide a method which renders it possible to make recesses with a high degree of accuracy so that the recesses can accept centering pins, other types of pins, screws, bolts or other male parts with a minimum of play or with no play at all.

Still another object of the invention is to provide a method of making recesses in the end faces of relatively thin workpieces in the form of cylinders, tubes, pipes, sheets or panels in such a way that the diameter or another maximum transverse dimension of a recess at least matches but can exceed the wall thickness of the workpiece.

A further object of the invention is to provide a novel and improved method of treating blanks which can be utilized for the making of covers or housings of friction clutches for use in motor vehicles.

Another object of the invention is to provide a method which can be resorted to for accurately assembling component parts of covers or housings for use in torque transmitting apparatus, such as friction clutches in motor vehicles.

A further object of the invention is to provide a method of making recesses which can be practiced by resorting to simple and readily available tools, implements and apparatus.

An additional object of the invention is to provide a torque transmitting apparatus at least one component of which has been treated in accordance with the above outlined method and which can be readily assembled or partially or fully dismantled in a time saving manner.

Another object of the invention is to provide a relatively complex aggregate which can be readily assembled or dismantled because one or more of its components were treated in accordance with the above outlined method.

Still another object of the invention is to provide a torque transmitting apparatus which employs a composite flywheel assembly and a friction clutch utilizing at least one component which has been treated in accordance with the above outlined method.

A further object of the invention is to provide a torque transmitting apparatus at least certain parts of which can be produced, finished, assembled and/or otherwise processed with substantial savings in energy and which is constructed and assembled in such a way that at least a majority of its constituents can be readily separated from each other for inspection, repair or replacement so that each set of parts consisting of the same material can be recycled in an ecologically acceptable manner.

Another object of the invention is to provide a torque transmitting apparatus which can be assembled, inspected, repaired and/or dismantled with greater facility and at a lower cost than heretofore known torque transmitting apparatus.

An additional object of the invention is to provide a torque transmitting apparatus which can be assembled with considerable savings in primary energy and with minimal waste in metallic material.

Still another object of the invention is to provide a method which renders it possible to provide one or more workpieces with tapped or untapped recesses without any contamination of the surrounding area.

A further object of the invention is to provide a method which renders it possible to provide metallic workpieces with recesses free of shavings and/or any other foreign particles necessitating collection and/or expulsion prior to putting the thus treated workpieces to actual use.

Another object of the invention is to provide a method which renders it possible to provide a metallic or partially metallic workpiece with one or more recesses without the need for cooling the workpiece or with minimal cooling.

An additional object of the invention is to provide a method which renders it possible to provide a metallic or at least partially metallic workpiece with one or more recesses without the need for lubrication of tools serving to provide the workpiece with a blind hole, a tapped hole or another recess.

Still another object of the invention is to provide a method which renders it possible to reduce the overall weight of a finished workpiece and which can be practiced in such a way that the tools and/or implements which are used to make one or more recesses can be put to use in, or in conjunction with, the thus treated workpiece.

A further object of the invention is to provide a composite flywheel assembly, particularly for use in torque transmitting apparatus of the type employed in motor vehicles, which is more compact, particularly in the radial direction, than heretofore known flywheel assemblies.

Another object of the invention is to provide a torque transmitting apparatus which is constructed and assembled in such a way that the space heretofore occupied by conventional flywheel assemblies can be put to use to accommodate other components of such apparatus.

An additional object of the invention is to provide a novel and improved cover or housing for connection to the diaphragm spring, damper or dampers, clutch disc, pressure plate and/or other components of a friction clutch for motor vehicles.

SUMMARY OF THE INVENTION

One feature of the present invention resides in the provision of a method of making a recess (e.g., a blind hole or a through hole) in a surface of a workpiece containing a metallic material. The improved method comprises the step of driving into the surface of the workpiece a material displacing tool which includes a trailing portion having a larger first cross-sectional area and a front portion or leader having a smaller second cross-sectional area. The driving step includes advancing the tool in the longitudinal direction thereof, namely in a direction from the trailing portion toward the leader so that the leader penetrates a selected portion of the surface of the workpiece and displaces the material of the workpiece at least substantially transversely of the aforementioned direction.

In many instances, the recess will have to be formed in an end surface of a workpiece which has a predetermined length (as measured from the end surface). The advancing step of such method can include moving the tool substantially lengthwise of the workpiece.

If the workpiece has a predetermined minimum wall thickness prior to the tool advancing step and the surface is an end surface of the workpiece, the driving step can include utilizing a tool which is dimensioned to provide the surface of the workpiece with a recess having a maximum transverse dimension at least matching the minimum wall thickness, i.e., the maximum transverse dimension (such as the diameter of a circular recess) can exceed the minimum wall thickness of the workpiece.

The method can further comprise the step of fixedly holding the workpiece adjacent the selected portion of the surface, at least in the course of the advancing step.

If the recess is to be made in an end portion of a tubular workpiece, the aforementioned surface can constitute an end surface of the end portion of such tubular workpiece.

The method can further comprise the step of converting a blank (such as a piece of sheet metal) into the workpiece prior to the driving step, and the converting step can include drawing, forging and/or otherwise shaping the blank. The blank can be converted into a tubular (e.g., an at least substantially cylindrical) workpiece.

The workpiece can have at least one additional surface, and the method can further comprise the step of calibrating, at least in part, the at least one additional surface. For example, the recess might be necessary in an end face of a tubular workpiece further having an internal surface and an external surface; the calibrating step can include calibrating the internal and/or the external surface of such workpice.

If the workpiece is designed to have an axis of rotation, the direction of advancement of the leader of the tool into a surface of such workpiece can be at least substantially parallel to the axis of rotation.

The method can further comprise the step of leaving at least the leader of the tool in the recess. Alternatively, the method can comprise the additional step of withdrawing the tool from the recess.

The driving step can include employing a tool which imparts to the recess a substantially circular, polygonal, oval or other cross-sectional outline.

The method can comprise the additional step of anchoring an element in the recess. The anchored element can include or constitute a locating or centering pin. Such anchored element can constitute a portion of or the entire material displacing tool, i.e., the tool can be left in the freshly formed recess to constitute an anchoring, locating, centering or like element.

The method can also comprise the additional step of providing the workpiece with an internal thread in the recess. Such additional step can include employing a tapping tool which does not remove shavings from the workpiece, e.g., a so-called thread rolling tool or an analogous tool. The tapping tool can be constituted by the aforediscussed material displacing tool which is used to make the recess.

The method can also include the step of anchoring the workpiece of a male fastener including a first portion in the recess and an externally threaded second portion outside of the recess. Such method can also comprise the step of moving at least one nut into mesh with the externally threaded second portion of the fastener. The anchoring step can include employing a male fastener having an externally threaded first portion in mesh with the workpiece. The male fastener can include or constitute a screw or a bolt. For example, the anchoring step can include employing a male fastener having a first portion which displaces the material of the workpiece during introduction into the workpiece. The method can also comprise the step of withdrawing the material displacing tool from the recess prior to the anchoring step.

At least a portion of the workpiece can consist of sheet metal, and the driving step can include making in the sheet metal a recess in the form of a through hole or a blind hole.

Another feature of the invention resides in the provision of a metallic component which can constitute an element of a friction clutch and has a surface provided with at least one recess which is formed in accordance with the aforediscussed method, i.e., as a result of driving into the surface of the metallic component a material displacing tool (of the type including a trailing portion having a larger first cross-sectional area and a front portion or leader having a smaller second cross-sectional area) in such a way that the leader has penetrated the surface in a direction from the trailing portion toward the leader (which latter can constitute or include a substantially conical or pyramidal tip) and the tool has displaced the material of the metallic component at least substantially transversely of the aforementioned direction from the trailing end toward the leader. The metallic component can include or constitute or form part of a housing or casing. For example, the housing or casing can include a tubular (e.g., at least substantially cylindrical) section having an end portion, and a second section which is separably affixed to the tubular section. The aforementioned recess surface is or can be provided on the tubular section of the housing or casing.

A further feature of the invention resides in the provision of a friction clutch which comprises a composite flywheel assembly connectable to a combustion engine and including a secondary flywheel, and a tubular (e.g., an at least substantially cylindrical) metallic component which is carried by the secondary flywheel and has a surface provided with a plurality of tapped recesses (e.g., in the form of blind holes) which are spaced apart from each other circumferentially of the tubular component. At least one of the recesses is obtained in accordance with the aforediscussed method, i.e., as a result of driving into the surface a material displacing tool, including a trailing portion having a larger first cross-sectional area and a leader or front portion having a smaller second cross-sectional area, in such a way that the leader has penetrated into the surface in a direction from the trailing portion toward the leader and the tool has displaced the material of the metallic component at least substantially transversely of the aforementioned direction. The clutch further comprises a housing or cover section adjacent the surface of the metallic component, and threaded fasteners (e.g., in the form of bolts or screws) which secure the housing or cover section to the metallic component and have portions (e.g., in the form of externally threaded shanks) extending into the recesses. The housing or cover section can extend substantially radially of and can be separably secured to the tubular metallic component. Such friction clutch can further comprise a diaphragm spring or an analogous resilient biasing device which is tiltably carried by the housing or cover section. The secondary flywheel is rotatable about a predetermined axis and the friction clutch can further comprise a pressure plate and means for non-rotatably but axially movably securing the pressure plate to the tubular metallic component for movement in the direction of the axis of the secondary flywheel. Such friction clutch can further comprise energy storing elements which are deformable in the circumferential direction of the composite flywheel. The tubular component of such friction clutch can be provided with means (e.g., in the form of arms) for deforming or stressing the energy storing elements. The energy storing elements can include or constitute elongated arcuate coil springs.

An additional feature of the present invention resides in the provision of a torque transmitting apparatus which comprises a composite housing or cover rotatable about a predetermined axis and including a component extending in the direction of the axis and having a surface provided with at least one recess formed in accordance with the aforediscussed method, i.e., such recess can be obtained as a result of driving into the surface a material displacing tool (including a trailing portion having a larger first cross-sectional area and a front portion or leader having a smaller second cross-sectional area) in such a way that the leader has penetrated the surface in a second direction from the trailing portion toward the leader and the tool has displaced the material of the component at least substantially transversely of the second direction. The second direction is or can be at least substantially parallel to the direction of extension of the aforementioned component. The housing can constitute a cover of a friction clutch for use in motor vehicles.

An additional feature of the present invention resides in the provision of an apparatus for compensating for torsional stresses. Such apparatus comprises a first flywheel which is connectable with an engine (e.g., with the crankshaft or an analogous output element of the engine in a motor vehicle), and a second flywheel connectable with an input element of a transmission (such as a variable-speed transmission in the power train between the engine and the wheels of a motor vehicle). The flywheels are rotatable relative to each other and the apparatus further comprises at least one damper having means (such as the aforediscussed arcuate coil springs) for yieldably opposing rotation of the flywheels relative to each other. Such apparatus preferably further comprises at least one antifriction bearing which is interposed between the flywheels, and a metallic component which is affixed to one of the flywheels (particularly to the second flywheel) and extends in the direction of the axis of rotation of the one flywheel. The component has a surface provided with at least one recess formed in accordance with the aforediscussed method, namely as a result of driving into the surface a material displacing tool (including a trailing portion having a larger first cross-sectional area and a front portion or leader having a smaller second cross-sectional area) in such a way that the leader has penetrated the surface in a second direction from the trailing portion toward the leader and the tool has thereby displaced the material of the component at least substantially transversely of the second direction. The apparatus further comprises a housing portion or cover portion which is connectable to the aforediscussed component, e.g., by fasteners one of which extends into the aforediscussed recess. The apparatus of the just outlined character can further comprise means (e.g., bolts or analogous threaded fasteners) for affixing one of the flywheels (normally the first flywheel) to an output element of a combustion engine.

Still another feature of the invention resides in the provision of a friction clutch which comprises a housing or cover made at least in part of sheet metal and including an at least substantially cylindrical first section having an axial end and a second section disposed at the axial end and extending at least substantially radially of the first section, threaded fasteners which separably connect the two sections to each other, a pressure plate which is non-rotatably affixed to the housing or cover for movement in the axial direction of the first section, and means (e.g., including a diaphragm spring) for biasing the pressure plate axially of the first section. The axial end of the first section preferably includes a surface which is provided with recesses extending substantially axially of the first section and formed in accordance with the aforediscussed method, namely as a result of driving into the surface a material displacing tool which has displaced the material of the first section substantially radially of the respective recess.

An additional feature of the invention resides in the provision of a friction clutch comprising a component (such as a cover or housing) including a substantially cylindrical section, a composite flywheel assembly including a flywheel connectable with an output element of a combustion engine, energy storing elements acting in the circumferential direction of and reacting against the flywheel assembly, and torque transmitting elements provided on the substantially cylindrical section and bearing against the energy storing elements. The aforementioned component can comprise a second section which is separably affixed to the substantially cylindrical section. The latter consists of or can consist, at least in part, of a metallic sheet material. The substantially cylindrical section preferably includes a surface which is adjacent the second section and is provided with recesses at least one of which is obtained as a result of displacing the material of the substantially cylindrical section substantially radially of the axis of the at least one recess, preferably entirely without removal of shavings and/or otherwise configurated pieces of the substantially cylindrical section.

The novel features which are considered as characteristic of the invention are set forth in particular in the appended claims. The improved method itself, however, together with additional features and advantages thereof, will be best understood upon perusal of the following detailed description of certain presently preferred specific embodiments with reference to the accompanying drawings.

BRIEF DESCRIPTION OF THE DRAWINGS

FIG. 2 is an enlarged fragmentary front elevational view of the component substantially as seen in the direction of arrow II in FIG. 1, and further showing portions of means for clamping or holding the component during the making of recesses in its surface;

FIG. 3 is a transverse sectional view substantially as seen in the direction of arrows from the line III—III in FIG. 2, and further shows a portion of a material displacing tool which is used to make recesses in the surface of the component shown in FIG. 2;

FIG. 4 is an enlarged view of a detail within the phantom-line circle IV of FIG. 3 and further illustrates a portion of a modified material displacing tool; and FIG. 5 is a fragmentary axial sectional view of still another material displacing tool.

DESCRIPTION OF PREFERRED EMBODIMENTS

Figure 1:
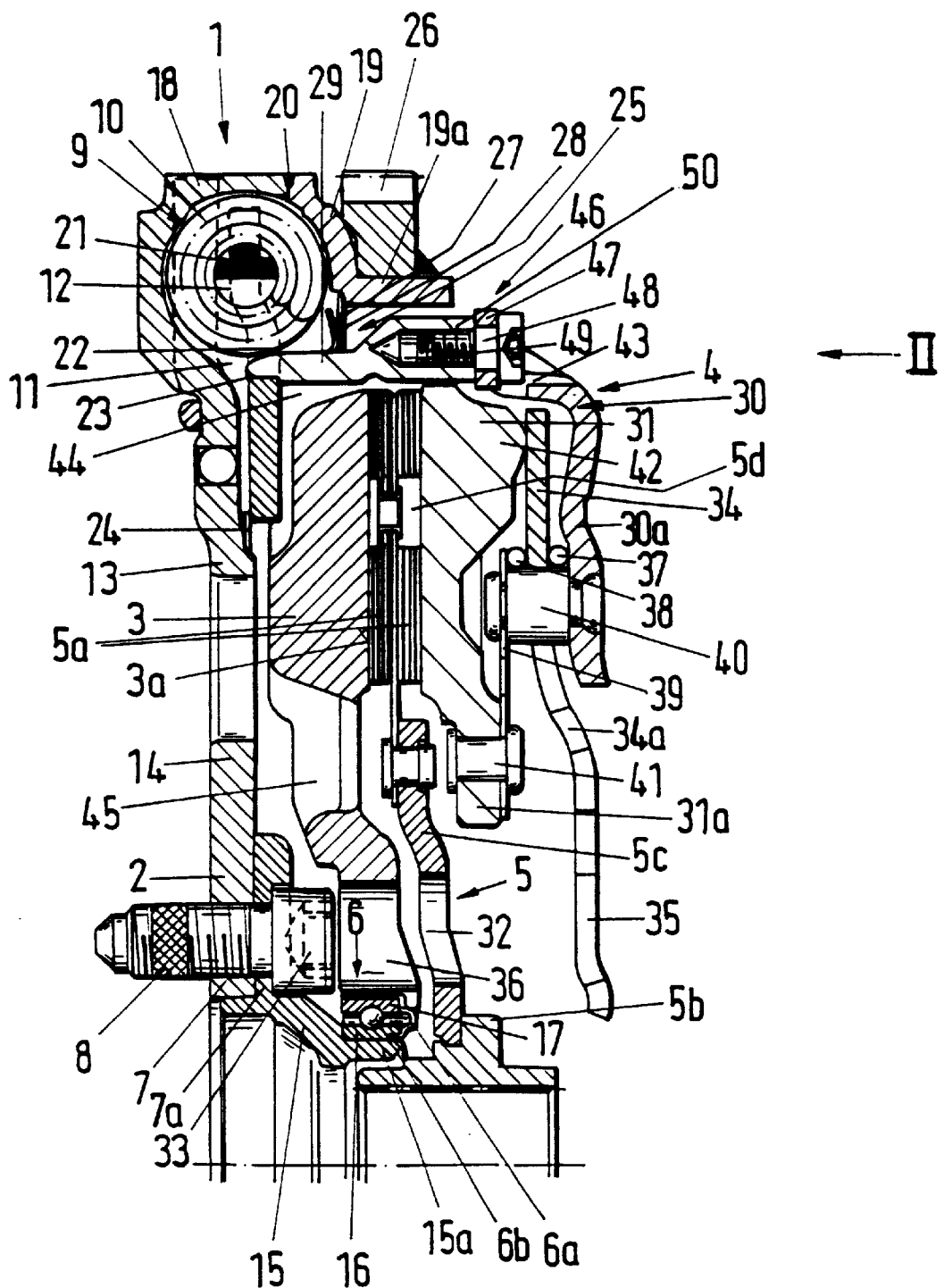
FIG. 1 is a fragmentary axial sectional view of a torque transmitting apparatus including a friction clutch having a component with a surface which is recessed in accordance with the method of the present invention.

Referring first to FIG. 1, there is shown a torque transmitting apparatus which includes a composite flywheel assembly 1 with a primary or first flywheel 2 and a coaxial secondary or second flywheel 3, and a friction clutch 4 having a clutch plate or clutch disc 5 with friction linings 5a adjacent an annular friction surface 3a of the secondary flywheel 3. The primary flywheel 2 can be separably affixed (i.e., detachably connected together) to the output element (e.g., a crankshaft) of an internal combustion engine, and the clutch disc 5 has a hub 5b which can be non-rotatably affixed to the input element of a variable speed transmission in a motor vehicle. Reference may be had, for example, to commonly owned U.S. Pat. No. 5,156,249 granted Oct. 20, 1992 to Friedmann for "Torque transmitting apparatus with axially deformable primary flywheel" and/or to commonly owned U.S. Pat. No. 5,160,007 granted Nov. 3, 1992 to Reik and Jäckel for "Apparatus for transmitting torque in the power trains of motor vehicles". The disclosures of these patents and of all other publications mentioned in the specification of the present application are incorporated herein by reference.

The friction clutch 4 further comprises a pressure plate 31 which is non-rotatably but axially movably coupled to the secondary flywheel 3 by a composite clutch housing or cover 30 in a manner to be described in greater detail hereinafter. When the friction clutch 4 is engaged, the pressure plate 31 is biased toward and against the adjacent friction lining 5a of the clutch disc 5 so that the other friction lining 5a is urged against the surface 3a of the flywheel 3 and the latter rotates the input element of the transmission by way of the hub 5b when the secondary flywheel 3 receives torque from the primary flywheel 2, i.e., from the output element of the engine.

The illustrated clutch disc 5 constitutes but one of a large number of devices which can be used in the clutch 4 (or in an analogous friction clutch) to transmit torque to the input element of the transmission when the clutch 4 is engaged. For example, the rigid annular flange 5c of the illustrated clutch disc 5 can be replaced with a flange which is provided with one or more dampers and/or friction generating devices operating between the friction linings 5a and the hub 5b. Alternatively, or in addition to such damper or dampers and/or friction generating devices, the clutch disc 5 can be equipped with means for yieldably mounting the friction linings 5a on the flange 5c. Still further, the separately produced rivets 5d which are used to secure the friction linings 5a to the flange 5c of the illustrated clutch disc 5 can be replaced with rivets which are of one piece with the flange 5c. All such features are described and shown in numerous United States and foreign patent applications and patents of the assignee of the present application. Reference may be had, by way of example only, to commonly owned U.S. Pat. No. 5,161,660 granted Nov. 10, 1992 to Huber for "Clutch plate with plural dampers" which describes and shows that the connection between the friction linings and the hub of a clutch disc can comprise one or more dampers and/or friction generating devices.

The torque transmitting apparatus of FIG. 1 further comprises an antifriction ball bearing 6 here shown as comprising a single row of spherical antifriction rolling elements 6b between an inner race 16 and an outer race 17. The inner race 16 surrounds an adjacent part of the flywheel 2 and the outer race 17 is surrounded by an adjacent part of the flywheel 3. The entire bearing 6 is installed radially inwardly of axially parallel holes 7 which are provided in the primary flywheel 2 to receive the externally threaded shanks of fasteners 8 serving to separably affix the flywheel 2 to the output element of the engine in a motor vehicle. The purpose of the bearing 6 is to ensure that the flywheels 2, 3 are coaxial with each other and that they can turn relative to one another with a minimum of resistance other than that offered by constituents which are specifically provided in the torque transmitting apparatus of FIG. 1 for such purpose, i.e., to oppose and, if necessary, limit the extent of angular movement of the flywheels 2 and 3 relative to one another.

The illustrated antifriction bearing 6 is provided with a relatively simple cap-shaped sealing element 6a which can contain a supply of lubricant for the rolling elements 6b and/or serves as a thermal insulator between the sensitive parts of the bearing 6 and the secondary friction wheel 3. Such thermal insulation is desirable and often necessary because the secondary flywheel 3 is likely to be heated to an elevated temperature when the friction linings 5a of the clutch disc 5 are permitted to slip relative to the friction surface 3a at that side of the flywheel 3 which faces away from the flywheel 2. The sealing element 6a can further serve to prevent uncontrolled transfer of substantial amounts of heat from the secondary flywheel 3 to the primary flywheel 2.

The means for opposing rotation of the flywheels 2 and 3 relative to each other (or for opposing at least certain stages of such rotation) includes a damper 9 having arcuate energy storing elements 10 in the form of coil springs extending circumferentially of the flywheel assembly 1 and being installed in the radially outermost portion or compartment 12 of a ring-shaped chamber 11 defined by the primary flywheel 2. At least a portion of the chamber 11 is filled with a suitable lubricant (oil or grease), preferably a lubricant (fat or grease) of pasty consistency such that it is highly unlikely to assume the consistency of a low-viscosity liquid, even if heated to an elevated temperature.

The primary flywheel 2 in the torque transmitting apparatus of FIG. 1 comprises a main portion 13 which is preferably made of a suitable metallic sheet material but can also constitute a forging or an extrusion. The radially inner part 14 of the main portion 13 of the primary flywheel 2 is provided with the aforementioned holes 7 for the shanks of the fasteners 8 which separably affix the flywheel 2 (and hence the entire torque transmitting apparatus) to the output element of an engine. The chamber 11 and its compartment 12 are provided mainly in the radially outer part 18 of the main portion 13. The radially inner part 14 of the main portion 13 carries a separately produced tubular carrier 15 having an end portion 15a which is surrounded by the inner race 16 of the antifriction bearing 6. The radially outer portion of the carrier 15 is provided with holes 7a in register with the holes 7 in the radially inner part 14 of the main portion 13. The end portion 15a of the tubular carrier 15 has an external shoulder serving as an abutment for one axial end of the inner race 16, namely that end which is remote from the sealing element 6a.

The illustrated relatively complex secondary flywheel 3 can be replaced with a simpler (e.g., with a substantially flat washer-like) secondary flywheel without departing from the spirit of the present invention. The radially inner portion of the secondary flywheel 3 has an axial passage which receives the outer race 17 of the antifriction bearing 6 as well as the sealing element 6a and is provided with a shoulder for the adjacent axial end of the outer race 17.

The radially outer part 18 of the main portion 13 of the primary flywheel 2 surrounds a substantial portion of each coil spring 10 and its outermost portion extends axially of the composite flywheel assembly 1 in a direction away from the engine (which is assumed to be located to the left of the flywheel 2, as viewed in FIG. 1) so that it is disposed radially outwardly of the compartment 12. The internal surface of such axially extending portion of the radially outer part 18 of the main portion 13 can be actually contacted by the adjacent portions of the coil springs 10, especially when the flywheel 2 is caused to rotate at an elevated speed so that the springs 10 are acted upon by a pronounced centrifugal force. Alternatively, the inner side of the axially extending portion of the radially outer part 18 of the main portion 13 can be provided with a wear-resistant liner in the form of a trough or the like so that the radially outer portions of the coil springs 10 cannot move into actual contact with the flywheel 2. Reference may be had, for example, to the aforementioned commonly owned U.S. Pat. No. 5,156,249 to Friedmann.

The primary flywheel 2 further comprises an in part radially extending wall 19 which is welded (as at 20) to the adjacent axially extending portion of the radially outer part 18 of the main portion 13 and defines a relatively small portion of the compartment 12 for the coil springs 10 forming part of the damper 9. The wall 19 can be made of sheet metal. The radially outer part 18 and the wall 19 are provided with confronting arcuate sockets for portions of the coil springs 10. Furthermore, the radially outer part 18 and the wall 19 are provided with aligned axially extending partitions which are disposed between pairs of neighboring coil springs 10 and serve to stress the coil springs when the flywheel 2 is caused to turn relative to the flywheel 3 and/or vice versa. Reference may be had, for example, to the aforementioned commonly owned U.S. Pat. No. , 5,156,249 to Friedmann which shows that the external surfaces of the radially outer part of the main portion of the wall of the primary flywheel can be provided with depressions in the form of circumferentially spaced-apart pockets which define the aforementioned internal partitions and cooperate with suitably configured arms of the clutch housing or cover to ensure that the coil springs store at least some energy in response to rotation of at least one of the two flywheels relative to the other flywheel. The illustrated wall 19 is located at that side of the main portion 13 of the primary flywheel which faces away from the engine.

As shown in FIG. 1, the radially outer part 18 of the main portion 13 can surround a larger part of the damper 9 (especially the coil springs 10) than the wall 19. The substantially tubular or sleeve-like radially inner portion 19a of the wall 19 extends axially of the assembly 1 and away from the main portion 13.

Each of the coil springs 10 is received in a discrete arcuate portion of the compartment 12 between two axially extending partitions of the radially outer part 18 and two axially extending partitions of the wall 19. The aforementioned external pockets of the radially outer part 18 and wall 19 can be omitted if the partitions between the end portions of neighboring coil springs 10 are separately machined parts which are affixed to the internal surfaces of the part 18 and wall 19.

The friction clutch 4 further comprises a support 22 for torque transmitting elements in the form of arms 21 extending into the compartment 12 between pairs of neighboring coil springs 10. The support 22 is connected with and serves to transmit torque to the flywheel 3 in response to rotation of the flywheel 2 by the engine of the motor vehicle. The arms 21 extend substantially radially outwardly from the substantially disc-shaped central portion of the support 22. In lieu of employing a separately produced support 22, the damper 9 can be constructed in such a way that radially inner portions 23 of the arms 21 are of one piece with the secondary flywheel 3 and cause the flywheel 3 to rotate in response to rotation of the primary flywheel 2. The coil springs 10 of the damper 9 then react against the aforediscussed partitions of the radially outer part 18 of the main portion 13 of the primary flywheel 2 and bear against the adjacent arms 21. Reference may be had, for example, to commonly owned copending German patent application Serial No. P 42 12 954.0 and to the corresponding U.S. patent application Ser. No. 08/044,031 which describe and show a secondary flywheel of one piece with torque transmitting elements corresponding to the arms 21 shown in FIG. 1 of the present application. When the torque transmitting apparatus is not in use (i.e., when the flywheels 2 and 3 are not caused to rotate in order to transmit torque between the engine and the secondary flywheel 3), each arm 21 is located between a pair of aforementioned partitions, namely a partition on the radially outer part 18 of main portion 13 of the primary flywheel 2 and a partition on the wall 19 of the primary flywheel.

In accordance with a further modification which is not specifically shown in the drawing, the support 22 for the arms 21 need not be directly coupled to the secondary flywheel 3 but rather to one or more parts which, in turn, can transmit torque to the secondary flywheel. Still further, each of the arms 21 can be a separately produced part which is indirectly coupled with and can transmit torque to the secondary flywheel 3.

The area of that side or surface of the secondary flywheel 3 which is located opposite to and faces away from the friction surface 3a (i.e., which faces the main portion 13 of the primary flywheel 2) can be enlarged to thus ensure more satisfactory dissipation of heat which is generated when the left-hand friction lining 5a of the clutch disc 5 rubs against the surface 3a while at least one of the clutch constituents 3 and 5 rotates relative to the other. The left-hand surface of the secondary flywheel 3 can be enlarged by providing it with rhomboidal, diamond-shaped and/or otherwise configurated projections and/or depressions (not specifically shown) in the course of a calibrating operation upon the secondary flywheel. The latter can be made of steel and can constitute a stamping. Alternatively, the left-hand surface of the secondary flywheel 3 can be enlarged by providing it with one or more spiral-shaped and/or otherwise configurated grooves. Such groove or grooves can be formed by resorting to mechanical treatment with a suitable grooving or channelling tool or by causing an annular milling cutter (not shown) to penetrate into the flywheel 3 in such position that its axis is parallel or substantially parallel to (rather than coinciding with) the axis of rotation of the secondary flywheel. It has been found that any one of the just outlined surface enlarging techniques can be resorted to in order to ensure sufficient dissipation of heat by the secondary flywheel 3, i.e., to avoid an overheating of the primary flywheel 2 and/or of the antifriction bearing 6 and/or of one or more other sensitive parts of the torque transmitting apparatus. If the secondary flywheel 3 is a casting, the area of its left-hand surface can be enlarged (for the purpose of more satisfactory dissipation of heat) during making of the secondary flywheel, i.e., in the mold.

The chamber 11 and its compartment 12 are preferably sealed from the surrounding atmosphere in order to reduce the likelihood of escape of the preferably pasty lubricant of the coil springs 10 of the damper 9. FIG. 1 shows two sealing devices 24 and 25. The sealing device 24 is or resembles a ring-shaped part and is made of one piece; its radially inner part engages and is centered by an externally extending shoulder of the radially inner part 14 of main portion 13 of the primary flywheel 2. Such radially inner part of the sealing device 24 extends substantially radially outwardly into the axially extending annular clearance between the part 14 and the (preferably) enlarged left-hand surface of the secondary flywheel 3, i.e., opposite the friction surface 3a. The radially outer part of the sealing device 24 abuts, or is at least rather closely adjacent, a portion of the aforementioned support 22 for the arms 21 which engage the coil springs 10 of the damper 9. The support 22 maintains, or can maintain, the adjacent radially outer part of the sealing device 24 in a predetermined (optimum) axial position relative to the flywheels 2 and 3. The sealing device 24 can constitute or can act as a diaphragm spring which reacts against the primary flywheel 2 and bears against the support 22 in order to seal the corresponding portion of the chamber 11 from the atmosphere, particularly from openings which are provided in the main portion 13 of the primary flywheel 2. In order to be effective as a seal, the device 24 is installed between the primary flywheel 2 and the support 22 on the secondary flywheel 3 in at least partially stressed condition (as seen axially of the flywheels 2 and 3).

The primary flywheel 2 carries a customary starter gear 26 which is welded and/or otherwise reliably secured to the sleeve-like portion 19a of the wall 19.

The illustrated second sealing device 25 for the chamber 11 is a composite device including a first annular portion 27 having a substantially L-shaped cross-sectional outline and a substantially disc-shaped or washer-like second portion 28 which preferably constitutes a diaphragm spring and is stressed in the axial direction of the flywheels 2 and 3. The radially outer part of the second portion 28 reacts against that surface of the wall 19 which confronts the coil springs 10 in the radially outermost portion or compartment 12 of the chamber 11, and the radially inner part of the second portion 28 bears against the first portion 27 of the second sealing device 25. In this manner, the first portion 27 is biased in a direction toward the engine, i.e., toward the main portion 13 of the primary flywheel 2. The angle between the axially and radially extending components or legs of the first portion 27 is preferably at least slightly less than 90°, i.e., the portion 27 can have a substantially V-shaped cross-sectional outline. The axially extending leg of the portion 27 of the second sealing device 25 which is shown in FIG. 1 is a preferably tight fit on and is supported by the left-hand end of the sleeve-like portion or section 29 forming part of the clutch cover 30.

The devices 24 and 25 need not hermetically seal the respective portions of the annular chamber 11 from the atmosphere because the lubricant which is confined in and fills at least a portion of the chamber 11 is preferably of pasty consistency, i.e., its viscosity is high. Grease has been found to constitute a satisfactory lubricant for the coil springs 10 in the compartment 12 of the chamber 11. As a rule, the sealing devices 24, 25 serve primarily as a means for preventing penetration of dust and/or other foreign matter from the surrounding atmosphere into the chamber 11. They will serve to prevent the confined lubricant from escaping the chamber 11 only in the rather unlikely event that the viscosity of the lubricant decreases well below the anticipated value. The confined lubricant cannot escape the compartment 12 by flowing radially outwardly because the axially extending portion of the radially outer part 18 of main portion 13 of the primary flywheel 2 is welded or soldered (at 20) to the adjacent radially outer portion of the wall 19.

The friction clutch 4 and its disc 5 preferably constitute one constituent of a preassembled unit which further includes the composite flywheel 1 and the antifriction bearing 6. Such design of the improved torque transmitting apparatus has been found to be highly desirable and advantageous because the unit can be assembled at the manufacturing plant and can be shipped or otherwise delivered to an automobile making or assembling plant in a condition ready for attachment of the primary flywheel 2 to the output element of the engine. The making of the preassembled unit reduces the cost of assembling, shaping and/or storage as well as the cost of securing the unit to the input element of the engine. For example, by assembling the unit including the flywheels 2, 3, the friction clutch 4 and its disc 5, and the antifriction bearing 6, it is possible to dispense with several operations or steps which are necessary if all parts of the torque transmitting apparatus are to be assembled with each other and installed between the output element of the engine and the input element of the variable speed transmission at the automobile making or assembling plant. For example, the clutch disc 5 can be centered between the secondary flywheel 3 and the cover 30 of the friction clutch 4 at the plant where the improved apparatus is made and where the parts 2, 3 and 4, 5 are assembled to form a compact unit which is ready for shipment, storage or attachment to the output element of the engine. Moreover, the clutch disc 5 can be installed between the cover 30 and the secondary flywheel 3 with a higher degree of accuracy and within a shorter period of time than if such assembly of the part 5 with the parts 30 and 3 were to be carried out in the automobile making or assembling plant. In accordance with heretofore known techniques, centering of the clutch disc 5 between a flywheel and a clutch cover necessitates the utilization of a special tool, such as a mandrel, which can further serve to center the flywheel(s) on the output element of the engine. The fasteners which are used to secure a flywheel, forming part of a conventional torque transmitting apparatus, to the output element of an engine are installed on the flywheel at the time when such fasteners are to be driven into, or otherwise secured to, the output element. Still further, one can dispense with the step of removing the centering mandrel upon completion of attachment of a conventional torque transmitting apparatus of the input element of an engine. In addition, one dispenses with the heretofore necessary (and often rather complex) procedure of securing the friction clutch to the flywheel or to the flywheel assembly subsequent to attachment of the flywheel or flywheel assembly to the output element of the engine.

The provision of a preassembled unit, which further includes the antifriction bearing 6 or an analogous bearing, also contributes to simplicity of the improved torque transmitting apparatus and to convenient installation of such apparatus in a motor vehicle. The bearing 6 is properly centered on the end portion 15a of the carrier 15 forming part of the primary flywheel 2 and within the axial passage in the secondary flywheel 3.

It is further desirable to install the externally threaded shanks of the fasteners 8 in the respective holes 7 during assembly of the aforementioned unit including the parts 2, 3, 4 (with 5) and 6. This results in further shortening of the interval which is needed to separably affix the primary flywheel 2 to the output element of an engine. Each of the fasteners 8 can constitute a so-called hexagon socket screw or bolt, i.e., a bolt having a head 33 with a polygonal socket for the working end of a tool which is used to drive the shank of a fastener 8 into the adjacent tapped bore or hole in the output element of the engine. The fasteners 8 can be securely held in their holes 7 by resorting to elastic securing means, preferably securing means of the type to be destroyed or to yield when the working end of the aforementioned tool is introduced into the socket of the respective head 33. Thus, the securing means must or should be designed to prevent separation of the fasteners 8 from the primary flywheel 2 prior to attachment of such flywheel to a crankshaft or another suitable output element of an engine. Reference may be had to the aforementioned commonly owned U.S. Pat. No. 5,160,007 to Reik et al. which fully describes and shows suitable securing means as well as a tool which can be used to drive the fasteners for the primary flywheel home by overcoming the resistance of (e.g., by destroying or by pushing aside) the securing means.

The flange 5c of the clutch disc 5 has holes 32 (e.g., at least substantially circular openings or slots having an oval or a polygonal outline) which are in at least partial alignment with the holes 7 in the preassembled unit including the flywheels 2, 3, the clutch 4, the bearing 6 and the fasteners 8. This ensures that the working end of the aforementioned torque transmitting tool can be inserted into the sockets of the heads 33. As already mentioned above, the clutch disc 5 is centered between the friction surface 3a of the secondary flywheel 3 and the pressure plate 31 of the friction clutch 4 during the making of the aforementioned preassembled unit so that the axis of the clutch disc 5 automatically coincides with the axis of the output element of the engine when such output element is properly connected with the primary flywheel 2. The cross-sectional area of each hole 32 can be smaller than the cross-sectional area of the head 33 of a fastener 8; this also ensures that the fasteners 8 cannot be lost or misplaced once the assembly of the aforementioned unit is completed; at the same time, such relatively small holes 32 still permit the introduction of the working end of a torque transmitting tool into the preferably hexagonal socket in a selected head 33 in order to drive the shank of the respective fastener 8 into the adjacent tapped bore or hole in the output element of the engine.

The diaphragm spring 34 of the friction clutch 4 is also provided with holes 35 or analogous passages for the torque transmitting tool, and such holes or passages are aligned with the holes 32 of the clutch disc 5 as well as with the holes 7 in the primary flywheel 3, at least to an extent which is necessary to permit entry of the working end of a torque transmitting tool into the socket of any one of the heads 33. The holes or passages 35 can constitute enlarged portions of slots between certain pairs of neighboring substantially radially extending prongs or tongues 34a of the diaphragm spring 34.

Additional holes or passages 36 are provided in the radially inner portion of the secondary flywheel 3, and each hole 36 is in at least partial alignment with a hole or passage 35, a hole 32 and a hole 7, namely in an alignment which is needed to permit introduction of the torque transmitting tool into the socket of a selected head 33.

The friction clutch 4 of FIG. 1 is a so-called push-type clutch, i.e, the radially inner portions of prongs 34a forming part of the diaphragm spring 34 must be depressed (e.g., by a suitable bearing or another depressing means) in order to tilt the diaphragm spring relative to the cover 30 to an extent which is necessary to permit disengagement of the pressure plate 31 from the adjacent lining 5a of the clutch disc 5 and to thus interrupt the transmission of torque from the secondary flywheel 3 to the input element of the variable speed transmission carrying the hub 5b. The diaphragm spring 34 automatically returns the pressure plate 31 into requisite engagement with the adjacent friction lining 5a as soon as the force acting upon the free end portions of the prongs 34a is terminated or relaxed so that the diaphragm spring can reassume the condition which is shown in FIG. 1.

However, the present invention can be embodied with equal or similar advantage in a torque transmitting apparatus employing a so-called pull-type friction clutch, namely a clutch wherein the prongs of the diaphragm spring must be pulled in a direction away from the pressure plate in order to disengage the friction clutch. between two ring-spaced seats 37, 38 which can be made of metallic wire or the like. The seat 37 is immediately adjacent the inner side of a radially extending second portion or section 30a of the clutch cover 30, the circumferentially complete main portion of the diaphragm spring 34 is disposed between the seats 37, 38 and these seats are held in requisite positions on the section 30a by a set of rivets 40 (only one shown in FIG. 1). The rivets 40 further carry portions of leaf springs 39 which serve to affix the pressure plate 31 to the cover 30 in such a way that the pressure plate is held against rotation relative to the parts 3 and 30 but is free to move (within limits) axially of the composite flywheel assembly 1 when the friction clutch 4 is disengaged. Several discrete leaf springs 39 can be replaced with a single resilient element which is designed to ensure that the pressure plate 31 rotates with the cover 30 and secondary flywheel 3 but is free to perform limited axial movements when the clutch 4 is disengaged. Furthermore, the leaf springs 39 (or the aforementioned one-piece substitute for such springs) can perform (and normally does perform) the additional function of automatically disengaging the left-hand (friction) surface of the pressure plate 31 from the adjacent friction lining 5a when the clutch 4 is disengaged, i.e., when the pressure plate 31 is free to move away from and in the axial direction of the secondary flywheel 3.

As can be seen in FIG. 1, one end portion of each leaf spring 39 is affixed to the section 30a of the clutch cover 30 by a rivet 40, and the other end portion of each leaf spring 39 is affixed to a radially inwardly extending arm 31a of the pressure plate 31 by a rivet 41. The rivets 41 can be replaced with rivet-shaped integral portions of the pressure plate 31; the connections between the leaf springs 39 and the pressure plate are then shifted (or can be shifted) radially outwardly to be aligned with portions of the right-hand friction lining 5a. Furthermore, radially outward shifting of connections between the leaf springs 39 and the pressure plate 31 can also take place if the rivets 41 are replaced with blind rivets. Such modified connection between the pressure plate 31 and the leaf springs 39 (or a one-piece substitute for the leaf springs 39) can be used with particular advantage if the pressure plate 31 is a forging or stamping. The necessary space (occupied by the projections 42 of the pressure plate 31 shown in FIG. 1) for engagement between the pressure plate and the main portion of the diaphragm spring 34 can be taken up by such projections 42 or, alternatively, by a preferably circular ring-shaped insert (not shown) which is partially recessed into a circumferentially extending groove (not shown) in the right-hand side or surface of the pressure plate. The insert can be a press fit or it can be otherwise secured in the groove of the pressure plate 31. If the illustrated push-type friction clutch 4 is replaced with a pull-type friction clutch, those end portions of the leaf springs 39 which are affixed to the pressure plate 31 are preferably located radially outwardly of the rivets 40 and/or the main portion of the diaphragm spring 34. Moreover, it is then possible or necessary to provide discrete rivets or other suitable connectors (in addition to the rivets 40) in order to secure one end portion of each leaf spring 39 to the clutch cover 30.

The holes 36 in the secondary flywheel 3 and the holes 32 in the flange 5c of the clutch disc 5 further serve to permit and/or induce the circulation of air to thus maintain the improved apparatus at an acceptable temperature. Additional ventilating holes or passages 43 are provided in the clutch cover 30, and the secondary flywheel 3 is also provided with ventilating holes or passages 44 and 45. Adequate cooling of the entire apparatus exhibits a number of important advantages; for example, the paste-like lubricant which fills at least a portion of the chamber 11 (particularly the compartment 12) is less likely to be heated to a temperature at which its viscosity is greatly reduced so that at least some of the lubricant would be likely to escape from the chamber 11 by flowing past the sealing device 24 and/or 25. Moreover, overheating would be likely to shorten the useful life of the apparatus.

The apparatus can be further provided with a pilot bearing (not shown) which is to be installed in the primary flywheel 2 to enter a socket in the output element of the engine. For example, the pilot bearing can be installed in the radially inner portion of the tubular carrier 15. Still further the damper 9 can be used in conjunction with, or it can be replaced by, one or more different dampers and/or by one or more friction generating devices (not shown) which are effective during each and every stage or during certain stages of angular movement of the flywheels 2, 3 relative to each other. If two or more friction generating devices are to be employed, they may but need not be of identical design. A pilot bearing is shown, for example, in FIG. 2 of the aforementioned commonly owned U.S. Pat. No. 5,160,007 to Reik et al. Friction generating devices are shown, for example, in commonly owned U.S. Pat. No. 5,146,811 granted Sep. 15, 1992 to Jäckel for "Vibration damping apparatus".

The tubular section 29 of the composite clutch cover 30 is provided with recesses 49 and 51 (FIG. 2) which are formed therein in accordance with the method of the present invention. This tubular section is fixedly secured to and thus shares all movements of the secondary flywheel 3; in addition, the section 29 is connected with the radially extending section 30a of the cover 30 by a set 46 of threaded connecting elements or fasteners 48 at least some of which extend into the recesses 49 and/or 51, all as will be described in greater detail hereinafter. The section 29 can constitute a treated metallic workpiece in the form of a thin-walled cylinder with the recesses 49, 51 provided in that end face or surface 50a (FIGS. 2 to 4) of the cylinder which is adjacent the radially outer part of the section 30a. The latter is provided with substantially flange-like radially outwardly extending portions 47 each of which is secured to the adjacent axial end 50 of the section 29 by at least one threaded fastener 48. The axes of the fasteners 48 are at least substantially parallel to the axis of the composite flywheel assembly 1. The heads of properly applied fasteners 48 bear against the outer sides of the respective flange-like portions 47 and the shanks of such fasteners extend into the tapped recesses 49 of the adjacent axial end 50 of the section 29. The recesses 51 (also provided in the end surface 50a of the axial end 50) are not tapped and alternate with the tapped recesses 49 in the circumferential direction of the section 29. The arrangement may be such that individual recesses 51 alternate with sets of two or more recesses 49, that individual recesses 49 alternate with sets of two or more recesses 51 and/or that sets of two or more recesses 49 alternate with sets of two or more recesses 51.

The method of making the tapped recesses 49 will be described in detail with reference to FIGS. 2, 3 and 4. FIG. 2 shows the end surface 50a of the axial end 50 forming part of the section 29. The surface 50a is further provided with the untapped recesses 51 which serve to receive, for example, locating and/or centering pins having portions extending from the recesses 51 and into aligned recesses (e.g., through holes) in the flange-like portions 47 (and/or other portions) of the section 30a. The pins facilitate accurate centering of the sections 29 and 30a relative to each other during assembly of the composite clutch cover 30.

The wall thickness of the section 29 is changed in the regions of the recesses 49 and 51; the wall thickness of all other portions of the section 29 is or can be unchanged. As can be seen in FIG. 2, the diameter of a recess 49 or 51 exceeds the wall thickness of undeformed (non-recessed) portions of the section 29. The deformed portions of the section 29 immediately surround the respective recesses 49 and 51.

The wall thickness of the section 29 need not be constant from end to end, i.e., in the axial direction of such section. This can be seen in FIG. 3 which shows that the wall thickness of the left-hand axial end is less than that of the right-hand axial end portion 50. FIG. 3 further shows that, save for its deepmost portion, the diameter of the recess 49 which is shown therein can be constant and can exceed the original wall thickness of the respective portion of the section 29. For example, the origanal wall thickness of a portion which has been provided with a recess 49 or 51 can amount to approximately 90 percent of the diameter of the respective recess. The diameter of that portion of a centering or locating pin which is received in a recess 51 can exactly match or at least very closely approximate the diameter of the respective recess 51, i.e., it can also exceed the original wall thickness of that portion of the section 29 which is provided with a recess 51.

The recesses (such as 49 and/or 51) need not be provided only in the surface 50a; such recesses or similar recesses can also be formed in the other end face or surface 50b of the section 29. FIG. 3 shows that the surface 50b is provided with a recess in the form of a slot 52 extending from the surface 50b toward but well short of the surface 50a. The tongue-like portions or arms 52a between the slots 52 can serve to receive torque from the support 22 of arms 21 (see FIG. 1), i.e., to rotate the entire cover 34 in response to rotation of the secondary flywheel 3 (which mounts the support 22 and its arms 21). If the support 22 is omitted, the arms 52a between the recesses or slots 52 in the surface 50b of the section 29 can serve to directly engage the end portions of the adjacent coil springs 10, i.e., to constitute component parts of the damper 9. Still further, and if the support 22 and its arms 21 are omitted, the arms 52a between the recesses or slots 52 can serve to receive torque from the secondary flywheel 3, i.e., to rotate the cover 30, the diaphragm spring 34 and the pressure plate 31 in response to rotation of the flywheel 3.

It is further possible to provide additional recesses (e.g., in the form of slots resembling the slots 52) in the surface 50a of the section 29, e.g., so that such slots alternate with the recesses 49 and 51. The slots in the surface 50a can be used to establish paths for the flow of air which cools the torque transmitting apparatus in actual use.

In accordance with a presently preferred embodiment of the improved method, the section 29 of the composite cover 30 can be produced and treated in the following way: One starts with a first blank which is made of sheet metal and can constitute a flat plate or a coil. The plate or coil is trimmed or subdivided to constitute or to yield at least one second blank, e.g., a circular piece of a polygonal or oval piece of metallic sheet material. The second blank is thereupon shaped in a stamping or other suitable machine to be converted into a cupped body having an axially extending cylindrical or sleeve-like portion and a radially extending disc-shaped portion at one axial end of the cylindrical portion. The conversion of a second blank (e.g., a flat circular disc) into a cupped body can be effected by deep drawing, i.e., a technique which involves deformation of the second blank as a result of forming involving the combined application of tensile and compressive stresses. The thickness of the radially extending disc-shaped portion of the cupped body matches or at least approximates the thickness of the second blank. On the other hand, the thickness of the cylindrical sleeve-like portion of the cupped body exceeds the thickness of the second blank; this is due to the aforedescribed method (deep drawing) of converting the second blank into a cupped body; such deep drawing involves upsetting the part which is to constitute the sleeve-like portion. The sleeve-like portion of the cupped body serves for the making of the section 29, and the radially extending portion of the cupped body serves for the making of the section 30a of a finished clutch cover 30. The plastic deformation of second blank during deep drawing involves a flow of the metallic material to form the cylindrical sleeve-like portion; this is desirable and advantageous because the material of the sleeve-like portion is densified with attendant increase of stability.

Deep drawing constitutes but one of the procedures which can be relied upon in order to form a cupped body which is ready to be converted into a clutch cover 30. For example, it is possible to form the cupped body solely as a result of the application of pressure (e.g., in an extruder). Irrespective of the selected mode of converting a plate or disc (second blank) into a cupped body, it is advisable to resort to cold forming because this results in an increase of hardness of the material of the cupped body.

The just discussed making of the cupped body is preferably followed by a so-called ironing step which involves a reduction of the thickness of the cylindrical sleeve-like portion to a preferred thickness of the section 29. As already mentioned above, the wall thickness of the section 29 need not be constant, i.e., the ironing step need not involve a reduction of the thickness to a value which is the same in each and every zone of the sleeve-like portion of the cupped body. In many instances, the thickness of the section 29 will vary in a direction from the surface 50a toward the surface 50b, i.e., in the axial direction.

The ironing step renders it possible to select the dimensions of the sleeve-like portion (and hence of the section 29) with a high degree of accuracy which often suffices so that the sleeve-like portion and/or the section 29 need not be subjected to any additional calibrating treatment. In addition to involving a desirable calibration of the sleeve-like portion of the cupped body, the ironing step is desirable on the ground that it further enhances certain desirable qualities (such as hardness) of the section 29.

The ironing step is followed by a severing step which involves separation of the cylindrical sleeve-like portion from the radially extending portion of the cupped body. If necessary, the external and/or the internal surface of the separated cylindrical sleeve-like portion can be subjected to a calibrating treatment; such treatment can involve calibration of a portion of or of the entire internal and/or external surface of the separated or severed sleeve-like portion. It is to be noted, again, that the aforediscussed ironing of the cylindrical sleeve-like section prior to severing of the cupped body often suffices to ensure adequate calibration of the section 29, i.e., calibrating of the internal and/or external surface of the sleeve-like portion subsequent to severing of the cupped body is optional and can be dispensed with in many instances.

The next step involves the making of recesses 49, 51 in the surface 50a of axial end 50 of the section 29 (i.e., of the separated cylindrical sleeve-like portion of the cupped body). To this end, the section (workpiece) 29 is clamped between two work holders 53, 54 (FIGS. 2 and 3) in such a way that the work holders provide room for radial expansion of those selected portions of the axial end 50 which are to be provided with the recesses 49 and 51. The outer work holder 53 has a concave internal surface with sockets 55 which permit the material of the section 29 to flow transversely of the axes of the recesses 49 and 51. Each socket 55 is in register with a socket 56 in the convex external surface of the other work holder 54 which is surrounded by the section 29. FIG. 3 shows that the sockets 55 and 56 need not extend all the way between the surfaces 50a and 50b but only to an extent which is necessary to take into consideration the desired axial length (depth) of the recesses 49 and 51 each of which constitutes a blind hole.

FIG. 3 shows a portion of an elongated piercing or material displacing tool 57 in the form of a pin or post having a trailing portion 59a and a front portion or leader 59. The cross-sectional area of the trailing portion 59a is greater than that of the leader 59. The illustrated leader 59 constitutes a cone or a pyramid whose cross-sectional area decreases gradually in a direction (arrow 58) away from the trailing portion 59a. The tool 57 is driven into the surface 50a to a desired extent, i.e., to form a recess 49 or 51 of desired depth or axial length. The direction which is indicated by the arrow 58 is parallel to the axis of the section 29. Penetration of the leader 59 into the surface 50a takes place while the holders 53 and 54 clamp the workpiece (section 29) against any stray movements which could affect the accuracy of the positioning and/or orientation and/or dimensions of a recess 49 or 51. As the leader 59 (and thereupon the immediately following portion) of the tool 57 penetrates into the surface 50a, the metallic material of the section 29 is displaced radially outwardly into the adjacent sockets 55 and 56, i.e., transversely of the direction which is indicated by the arrow 58. The means (e.g., a hammer, a piston, a ram or any other suitable device) for driving the tool 57 into the surface 50a is not shown in the drawing. Such driving means can be caused to bear or to (if necessary repeatedly) strike against the enlarged trailing portion 59a of the tool 57. The illustrated trailing portion 59a is optional, i.e., the diameter of the tool 57 can be constant all the way from the rear end of the leader 59 to the rearmost end of the tool.

The illustrated tool 57 can constitute a centering or locating pin, i.e., it can remain in a recess 51 and that portion of the tool 57 which extends from a recess 51 then serves as a means for centering the sections 29 and 30a of an assembled cover 30 relative to each other.

Since the recesses 49 are provided with internal threads, it is necessary to extract a tool 57 which was used to form such recesses by pulling the tool in a direction counter to that indicated by the arrow 58, and the thus obtained recess (51) is converted into a tapped blind hole (49) by resorting to a suitable additional tool, e.g., a tool which can provide the surfaces surrounding the partially finished recesses 49 (each such partially finished recess can be said to constitute a recess 51) with a suitable internal thread without removing material from the section 29. The thread cutting tool can remain in the thus obtained (finished) recess 49, e.g., to receive one or more nuts or other internally threaded fasteners. For example, the internal thread can be formed with a sheet metal screw or such screw (note the fastener 48 in FIG. 1) can be driven into a recess 49 when the tapping operation is completed. The utilization of tapping tools which can provide the surfaces surrounding the recesses 51 with threads (to convert such recesses 51 into recesses 49) is preferred at this time because the material of the section 29 is not wasted and the machine in which the sections 29 are treated is not contaminated with fragments of removed metallic material. The tapping tools can receive nuts (to fix the section 29 to the section 30a) if such tools are not screws. If the tapping tools are not screws but the sections 29 and 30a are to be secured to each other by screw-like fasteners (such as 48), the tapping tools are removed from the freshly formed recesses 49 to be replaced with screws or bolts.

The material displacing tool 57 of FIG. 3 is but one example of a large variety of tools which can be utilized for the practice of the improved method. For example, the tool can have an oval, polygonal or other suitable cross-sectional outline departing from a circular outline. Furthermore, the leader of the tool need not be a cone or a pyramid as long as it is designed in such a way that its cross-sectional area is smaller than that of the (trailing) portion behind it. Still further, all of the recesses 51 or all of the recesses 49 need not be formed by resorting to one and the same material displacing tool or to a set of identical tools. For example, the surface 50a can be provided with an array of recesses 51 having different cross-sectional outlines, different depths and/or both, and the same holds true for the tools which are to be used to make the tapped recesses 49. Two or more material displacing tools can be applied simultaneously; for example, all of the recesses 51 can be made in a single step, all of the (untapped) recesses 49 can be made in a single step, and all of the still untapped recesses 49 can be tapped simultaneously.

It is further within the purview of the invention to employ one or more tools which are designed to provide a surface (such as the surface 50a) with one or more arcuate recesses. For example, and as shown in FIG. 5, a material displacing tool 257 can constitute a cylinder including a ring-shaped leader 259 and a trailing portion 259a having a larger cross-sectional area than the leader 259. The width of a recess which is obtained with the tool 259 can match the original wall thickness of a workpiece, such as the section 29 of FIGS. 1 to 4. The circumferentially complete recess which can be formed with the tool 257 can be replaced with an interrupted recess having two or more arcuate sections; this can be accomplished by using a tool which constitutes a modification of the tool 257, namely a tool having suitably distributed slots in the leader 259.

If the material of a workpiece which is to be provided with one or more recesses in accordance with the method of the present invention exhibits at least some resiliency, the material displacing tool can be designed in such a way that it permits some of the displaced metallic material to flow back radially inwardly toward the center of the recess. The tool 157 of FIG. 4 has circumferentially extending grooves 157a which are filled with the material of the workpiece 29 to ensure that the properly driven tool can be reliably held in the thus obtained recess. The discrete circumferentially extending grooves 157a can be replaced with one or more helical groves or with any other undercuts which enable the displaced material to flow back toward the axis of the recess and to thus anchor the material displacing tool in the recess. A material displacing tool of the type shown at 157 can be used for the making of recesses 49 and/or 51.

Any additional recesses which are to be provided in the section 29 of FIGS. 2, 3 and 4 can be formed in the surface 50a prior or subsequent to the making of recesses 49 and/or 51. The additional recesses can constitute slots (such as the slot 52 shown in FIG. 3), blind holes with or without threads therein and/or others. For example, recesses in the form of slots can be provided in the surface 50a simultaneously with the severing of a cupped body into two discrete parts one of which is to constitute the section 29 and the other of which is to constitute the section 30a of a clutch cover 30.

An important advantage of the improved method is that it renders it possible to provide one or more recesses by the simple expedient of displacing, rather than removing, some material of the workpiece. The material displacing tool exhibits the advantage that it is simple and inexpensive as well as that it can be left (at least under certain circumstances, i.e, for certain uses of the treated workpiece) in a freshly formed recess to thereupon form part of the treated workpiece and/or of the apparatus, device, machine or implement in which the workpiece is to be put to use. Furthermore, the improved method and the material displacing tool for the practice of such method exhibit the advantage that one or more recesses can be formed in a thin-walled workpiece, such as the section 29, and that the recess or recesses can extend in parallelism with the axis of a tubular or cylindrical workpiece.

Still another advantage of the improved method and of the material displacing tool is that the workpiece can be provided with one or more recesses having maximum transverse dimensions at least matching (but, if necessary, even greatly exceeding) the wall thickness of the workpiece prior to making of one or more recesses therein. The ratio of the initial wall thickness to the maximum transverse dimension of a recess can be in the range of 0.5 to 2, preferably 0.7 to 1.5. If a recess has a circular cross-sectional outline, its maximum transverse dimension matches the diameter, and such diameter can considerably exceed the thickness of a workpiece (such as a cover section 29) prior to the making of one or more recesses therein. However, and as already mentioned above, a recess which has been formed in accordance with the improved method can have an oval, polygonal or other non-circular cross-sectional outline.

The work holders 53, 54 of FIGS. 2 and 3 (or other suitable work holders) exhibit the advantage that they do not interfere with the flow of metallic material (transversely of the direction which is indicated by the arrow 58) during penetration of the leader 59 and of the next-following portion of a tool 57 into the surface 50*a*. Such design and mode of utilizing the work holders ensure that the material of the workpiece does not undergo any unnecessary or undesirable densification around a recess 49 or 51 during, or as a result of, penetration of the material removing tool 57 or another suitable tool into the surface 50*a*.

A hollow workpiece in the form of a tube or cylinder (such as the section 29 of the clutch cover 30) constitutes one of the presently preferred workpieces to be treated in accordance with the improved method. The workpiece is preferably treated in a drawing machine prior to the making of one or more recesses therein. Such treatment is described, for example, in commonly owned German patent application Serial No. P 41 32 421.8, which corresponds to U.S. application Ser. No. 07/952,582, now U.S. Pat. No. 5,257,715. The aforedescribed ironing operation prior to the making of one or more recesses in the workpiece exhibits the advantage that the workpiece need not be subjected (or need not always be subjected) to an additional or separate calibrating step when the ironing step is completed. This saves time and equipment and contributes to lower cost of the treated workpiece as well as of the entire apparatus in which the treated workpiece (with one or more recesses therein) is being put to use. In many instances, some calibrating of a portion of the external and/or internal surface of the workpiece prior to making of one or more recesses therein suffices even if the workpiece must be finished (e.g., converted into the tubular or cylindrical section of a clutch cover) with an externally high degree of precision.

The surface (such as the surface 50*a* of the section 29) to be provided with a recess can extend at right angles to the axis of the workpiece, and the axis of each of the recesses 49, 51 is or can be at least substantially parallel to such axis.

The method can be practiced by resorting to a single material displacing tool (such as 57) if a surface of a workpiece is to be provided with a single recess or with two or more identical recesses. The single tool must be withdrawn upon completion of the making of each preceding recess but can be left in the last one of a series of two or more recesses. Alternatively, the method can be practiced with a plurality of material displacing tools which can be driven into selected portions of a surface on a workpiece, either one after the other, in groups of two or more, or all at the same time, and thereupon remain in the respective recesses, e.g., to constitute the aforementioned centering and/or locating posts or pins which ensure reliable and predictable as well as highly accurate centering of the treated workpiece relative to an associated workpiece, e.g., of the section 29 relative to the section 30*a* of the clutch cover 30 which is shown in FIG. 1.

If the recess or recesses are to constitute tapped blind holes or through holes, it is often advisable to leave the tapping tools in the respective tapped holes. This ensures that the tools are received in the respective tapped holes with no play at all and can be utilized to center the finished workpiece relative to one or more additional parts with an extremely high degree of accuracy. This is often necessary in the friction clutch of a motor vehicle. Each of the thus anchored externally threaded tapping tools can be caused to mesh with one or more nuts or other internally threaded fasteners. Alternatively, each of the thus anchored externally threaded tools can be provided with an integral head which serves as a means for holding one or more additional parts in requisite position or positions related to the finished workpiece having one or more tapped holes with the tapping tool or tools remaining therein. Each tapping tool can be driven home in the respective tapped hole with a considerable force to reduce the likelihood of loosening in actual use of the apparatus which employs the finished workpiece.

If the workpiece is provided with one or more recesses in the form of untapped holes, each such recess can receive (preferably with minimal clearance or with no clearance at all) the smooth portion of a locating, centering or other pin, and each such pin can have an externally threaded portion outside of the respective untapped hole to accept one or more nuts or other female (internally threaded) fasteners.

Reliable anchoring of a locating or centering pin in an untapped recess (such as 51) can be ensured by positively displacing some of the previously displaced metallic material against the inserted portion of such pin. In other words, if the original material displacing tool is to be withdrawn from a freshly formed recess 51, it is replaced by the smooth portion of a centering pin and the material which has been displaced by the original material displacing tool is thereupon caused or permitted to move back toward its original position in order to reliably confine the smooth portion of the centering or locating pin in its recess. The arrangement is preferably such that a cylindrical centering or locating pin is reliably installed against any movement in the radial, axial and/or circumferential direction of the respective recess 51.

It has been found that the improved method can be resorted to with particular advantage for the treatment of workpieces which are to constitute component parts or constituents of friction clutches for use in motor vehicles or in torque transmitting apparatus, e.g., in apparatus of the type shown in FIG. 1. Such workpieces can be treated in accordance with the entire aforedescribed method (i.e., including the making of a first blank, converting the first blank into a second blank, converting the second blank into a cup-shaped body, cutting up the body to form two sections, ironing and/or otherwise calibrating the tubular section and providing the thus treated tubular section with one or more recesses in the end surface 50*a*, 50*b* and/or elsewhere. The thus treated tubular section 29 is then ready to be assembled with the section 30*a* to form therewith a clutch cover 30.

A workpiece which has been treated in accordance with the method of the present invention can be utilized with particular advantage in combination with a composite flywheel assembly, such as that including the flywheels 2, 3 shown in FIG. 1 and also described and shown in commonly owned published German patent application Serial No. P 40 27 629.5, which corresponds to U.S. application Ser. No. 07/708,935, now U.S. Pat. No. 5,261,516 and in the aforementioned commonly owned U.S. Pat. No. 5,160,007 to Reik et al. Thus, a workpiece having one or more recesses formed in accordance with the novel method can be mounted on the secondary flywheel to constitute a component part of a clutch cover. The section 29 of the cover 30 can be provided with a single set of recesses 51 (without threads), with a single set of recesses 49 in the form of tapped blind holes, or with a combination of tapped and untapped holes, depending on the nature of connection between the sections 29 and 30*a*. The section 30*a* will be separated from the section 29*a* in order to afford access to the diaphragm spring 34, to the pressure plate 31, to the leaf springs 39 and/or to any other parts which are not accessible while the section 30a is affixed to the section 29. Inspection, repair or replacement of the clutch disc 5 (or another clutch disc which is used in lieu of the clutch disc 5) also necessitates separation of the section 30a from the section 29. It has been found that the utilization of a set of threaded fasteners (such as 48) constitutes a very simple and highly satisfactory solution of the problem of affording convenient access to certain component parts of the friction clutch 4, namely to those parts which become accessible only upon detachment of the section 30a from the section 29.

Once the section 30a is separated from the section 29, it can be moved away from the secondary flywheel 3 together with the pressure plate 31, leaf springs 39, seats 37, 38 and diaphragm spring 34. This renders it possible to inspect and (if necessary) replace the parts 31, 34, 37, 38, 39 as well as to afford convenient access to the clutch disc 5.

Separation of the section 29 from the secondary flywheel 3 involves withdrawal of the aforementioned portions 52a between the slots 52 in the end surface 50b of the section 29 from the carrier 22, and the portions 52a are automatically reengaged with the support 22 when the section 29 is reattached to the secondary flywheel. All of the aforedescribed features simplify the assembly and dismantling of the friction clutch 4 and of the entire torque transmitting apparatus and render it possible to replace or inspect any of the parts which are not readily accessible in conventional friction clutches and torque transmitting apparatus. The portions 52a between the slots 52 can be of one piece with the section 29 or they can constitute separately produced parts which are welded, soldered or otherwise (directly or even indirectly) affixed to the section 29.

The method of the present invention can be practiced with particular advantage in connection with the treatment of workpieces which are to constitute component parts of composite covers or housings for friction clutches. As already described with reference to the drawings, the improved method can be resorted to with advantage for the treatment of the axially extending section 29 of a composite clutch cover, namely to provide the section 29 with one or more recesses in the form of tapped or untapped blind or through holes which can extend in parallelism with the axis of the section 29. However, it is equally possible to practice the improved method in connection with the making of recesses having axes which are inclined with reference to the axis of the workpiece. It has been found that the assembly of modules (such as the aforediscussed preassembled unit including the composite flywheel assembly 1, the bearing 6 and the friction clutch 4 including the clutch disc 5) can be simplified and the cost of such assembly reduced if at least one constituent of the assembly is treated in accordance with the method of the present invention. Such treatment can involve the making of one or more recesses exclusively in accordance with the improved method or the making of one or more recesses in accordance with the improved method and the making of one or more recesses by resorting to suitable material removing (rather than material displacing) tools or the like.

The improved method and the apparatus or parts thereof which are produced and/or treated in accordance with such method can be modified in a number of additional ways without departing from the spirit of the invention. For example, the method can be practiced to make recesses (e.g., blind holes and/or through holes with or without threads) in other components of a torque transmitting apparatus. Furthermore, the method can be practiced for the making of recesses in metallic parts other than those which are to be assembled into a torque transmitting apparatus, a friction clutch or another device destined for use in a motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A metallic component constituting an element of a friction clutch and having a tubular section which has an internal surface, an external surface and an axial end surface between said internal and external surfaces, said end surface being provided with at least one recess which is formed as a result of driving into the end surface a material displacing tool, said tool including a trailing portion having a larger first cross-sectional area and a leader having a smaller second cross-sectional area and having been driven into the end surface in such a way that the leader has penetrated the end surface in a direction from the trailing portion toward the leader and the tool has displaced the material of the metallic component at least substantially transversely of said direction.

2. The component of claim 1, comprising a housing including said tubular section and a second section detachably connected to the tubular section.

3. A friction clutch comprising a composite flywheel assembly connectable to a combustion engine and including a secondary flywheel; a tubular metallic component carried by said secondary flywheel and having a tubular section which has an internal surface, an external surface and an axial end surface between said internal and external surfaces, said axial, end surface being provided with a plurality of tapped recesses spaced apart from each other circumferentially of said tubular component, at least one of said recesses being formed as a result of driving into said end surface a material displacing tool, said tool including a trailing portion having a larger first cross-sectional area and a leader having a smaller second cross-sectional area and having been driven into said end surface in such a way that the leader has penetrated the end surface in a direction from said trailing portion toward the leader and the tool has displaced the material of the metallic component at least substantially transversely of said direction; a clutch housing section adjacent said end surface; and threaded fasteners securing said housing section to said component and having portions extending into said recesses.

4. The friction clutch of claim 3, wherein said housing section extends substantially radially of and is detachably connected to said tubular component, and further comprising a diaphragm spring tiltably carried by said housing section.

5. The friction clutch of claim 3, wherein said secondary flywheel is rotatable about a predetermined axis and further comprising a pressure plate and means for non-rotatably securing said pressure plate to said tubular component for movement in the direction of said axis.

6. The friction clutch of claim 3, further comprising energy storing elements deformable in the circumferential direction of said composite flywheel, said tubular component having means for deforming said energy storing elements.

7. A torque transmitting apparatus, comprising a composite housing rotatable about a predetermined axis, said housing including a component having a tubular section extending in the direction of said axis and having an internal surface, an external surface and an axial end surface disposed between said internal and external surfaces and provided with at least one recess which is formed as a result of driving into the end surface a material displacing tool, said tool including a trailing portion having a larger first cross-sectional area and a leader having a smaller second cross-sectional area and having been driven into said end surface in such a way that the leader has penetrated the end surface in a second direction from said trailing portion toward said leader and the tool has displaced the material of the component at least substantially transversely of said second direction.

8. The apparatus of claim 7, wherein said housing constitutes a cover of a friction clutch for use in motor vehicles.

9. Apparatus for compensating for torsional stresses, comprising a first flywheel connectable with an engine; a second flywheel connectable with an input element of a transmission, said flywheels being rotatable relative to each other; at least one damper having means for yieldably opposing rotation of said flywheels relative to each other, at least one antifriction bearing interposed between said flywheels; a metallic component having a tubular section affixed to one of said flywheels and extending in the direction of the axis of rotation of said one flywheel, said component having an internal surface, an external surface and an axial end surface disposed between said internal and external surfaces and having at least one recess formed as a result of driving into the end surface a material displacing tool, said tool including a trailing portion having a larger first cross-sectional area and a leader having a smaller second cross-sectional area and having been driven into said end surface in such a way that the leader has penetrated the end surface in a second direction from said trailing portion toward said leader and the tool has displaced the material of the component at least substantially transversely of said second direction; and a cover portion connectable to said component.

10. The apparatus of claim 9, further comprising means for affixing one of said flywheels to an output element of a combustion engine.

11. A friction clutch comprising a sheet metal housing including an at least substantially cylindrical first section having an axial end and a second section disposed at said axial end and extending at least substantially radially of said first section; threaded fasteners detachably connecting said sections to each other; a pressure plate non-rotatably affixed to said housing for movement in the axial direction of said first section; and means for biasing said pressure plate axially of said first section, said axial end having an internal surface, an external surface and an end surface disposed between said internal and external surfaces and provided with recesses extending substantially axially of said first section and formed as a result of driving into said end surface a material displacing tool which has displaced the material of said first section substantially radially of the respective recess.

12. A friction clutch comprising a component including a substantially cylindrical section; a composite flywheel assembly including a flywheel connectable with an output element of a combustion engine; energy storing elements acting in the circumferential direction of and reacting against said assembly; and torque transmitting elements provided on said substantially cylindrical section and bearing against said energy storing elements, said component further comprising a second section detachably connected to said substantially cylindrical section, said substantially cylindrical section consisting at least in part of a metallic sheet material and having an internal surface, an external surface and an end surface disposed between said internal and external surfaces adjacent said second section and being provided with recesses at least one of which is formed as a result of displacing the material of said substantially cylindrical section substantially radially of an axis of the at least one recess.

13. A metallic component constituting an element of a friction clutch and having an axially extending tubular section which consists of sheet metal, said tubular section having an axial cross-section which is longer in an axial dimension than in a radial dimension and which has an axial end surface, said end surface being provided with at least one recess for receiving a fastener for connecting a housing to said friction clutch, said at least one recess being formed as a result of displacement of said sheet metal and extending in said sheet metal in an axial direction of said tubular section.

14. A friction clutch comprising a composite flywheel assembly connectable to a combustion engine and including a secondary flywheel; a tubular metallic component carried by said secondary flywheel and having an axially extending tubular section which consists of sheet metal, said tubular section having an axial cross-section which is longer in an axial dimension than in a radial dimension and has an axial end surface, said axial end surface being provided with a plurality of tapped recesses spaced apart from each other circumferentially of said tubular component for connecting a housing to said friction clutch, said plurality of tapped recesses extending in said sheet metal in an axial direction of said tubular section.

15. A torque transmitting apparatus, comprising a composite housing rotatable about a predetermined axis, said housing including a component having an axially extending tubular section which consists of sheet metal and said tubular section having an axial cross-section which is longer in an axial dimension than in a radial dimension and which has an axial end surface provided with at least one recess for connecting a cover to said tubular section, said at least one recess being formed as a result of displacement of said sheet metal and extending in said sheet metal of said tubular section.

16. Apparatus for compensating for torsional stresses, comprising a first flywheel connectable with an engine; a second flywheel connectable with an input element of a transmission, said flywheels being rotatable relative to each other; at least one damper having means for yieldably opposing rotation of said flywheels relative to each other; at least one antifriction bearing interposed between said flywheels; a metallic component having an axially extending tubular section which consists of sheet metal and is affixed to one of said flywheels and extends in the direction of an axis of rotation of said one flywheel, said tubular section having an axial cross-section which is longer in an axial dimension than in a radial dimension and said tubular section having an axial end surface and at least one recess provided in said end surface for connecting a housing to said apparatus, said at least one recess being provided in said sheet metal of said tubular section.

17. A metallic component constituting an element of a friction clutch and having a tubular section of sheet metal, said tubular section having an axial end surface and said end surface being provided with at least one recess disposed in a tubularly extending portion of said tubular section and being formed as a result of displacement of said sheet metal.

18. A metallic component constituting an element of a friction clutch and having a tubular section of sheet metal, said tubular section having an axial end surface and at least one blind bore provided in said sheet metal at said axial end surface as a result of driving into said end surface a material displacing tool.

* * * * *

UNITED STATES PATENT AND TRADEMARK OFFICE
CERTIFICATE OF CORRECTION

PATENT NO.   : 6,056,099
DATED        : May 2, 2000
INVENTOR(S)  : Johann Jackel and Heinz Molt It is certified that errors appear in the above-identified patent and that said Letters Patent is hereby corrected as shown below:

On the Title Page, [54] Title: please change "METHOD OF MAKING RECESSES IN METALLIC WORKPIECES FOR USE TORQUE TRANSMITTING APPARATUS" TO -- METHOD OF MAKING RECESSES IN METALLIC WORKPIECES FOR USE IN TORQUE TRANSMITTING APPARATUS --.

Signed and Sealed this

Twenty-second Day of May, 2001

*Attest:*

NICHOLAS P. GODICI

*Attesting Officer*  *Acting Director of the United States Patent and Trademark Office*